US006998829B2

(12) United States Patent
Solie

(10) Patent No.: US 6,998,829 B2
(45) Date of Patent: Feb. 14, 2006

(54) SOFT START PRECHARGE CIRCUIT FOR DC POWER SUPPLY

(75) Inventor: Eric Magne Solie, Durham, NC (US)

(73) Assignee: Intersil Americas Inc., Milpitas, CA (US)

( * ) Notice: Subject to any disclaimer, the term of this patent is extended or adjusted under 35 U.S.C. 154(b) by 184 days.

(21) Appl. No.: 10/765,385

(22) Filed: Jan. 27, 2004

(65) Prior Publication Data

US 2004/0228152 A1    Nov. 18, 2004

Related U.S. Application Data

(60) Provisional application No. 60/470,299, filed on May 14, 2003.

(51) Int. Cl.
*G05F 1/40* (2006.01)
*G05F 1/10* (2006.01)

(52) U.S. Cl. .................................... 323/288; 323/238

(58) Field of Classification Search ............... 323/222, 323/226, 238, 242, 243, 268, 270, 271, 273, 323/275, 280, 282, 285, 288, 901; 363/49, 363/123
See application file for complete search history.

(56) References Cited

U.S. PATENT DOCUMENTS

| | | | | |
|---|---|---|---|---|
| 4,563,733 A | * | 1/1986 | Schlenk | 323/284 |
| 5,446,404 A | * | 8/1995 | Badyal et al. | 327/143 |
| 5,757,196 A | * | 5/1998 | Wetzel | 324/688 |
| 6,100,677 A | * | 8/2000 | Farrenkopf | 323/285 |
| 6,552,517 B1 | * | 4/2003 | Ribellino et al. | 323/282 |
| 2005/0024033 A1 | * | 2/2005 | Nakata | 323/282 |

\* cited by examiner

*Primary Examiner*—Matthew V. Nguyen
(74) *Attorney, Agent, or Firm*—Allen, Dyer, Doppelt, Milbrath & Gilchrist, P.A.

(57) ABSTRACT

A soft start circuit for a DC-DC converter has an input reference voltage coupled to an error amplifier and to a soft start capacitor. A feedback resistor is coupled between an output node and the error amplifier, whose output is coupled to a pulse width modulator (PWM). The PWM output is coupled through an inductor to the output node, to which an output capacitor referenced to ground is coupled. Means is provided to charge up the soft start capacitor to the output voltage while the converter is disabled. As a result, when enabled, the converter will not discharge the output capacitor, but will ramp the output voltage to the voltage Vref without excessive currents.

5 Claims, 1 Drawing Sheet

SOFT START PRECHARGE CIRCUIT FOR DC POWER SUPPLY

CROSS-REFERENCE TO RELATED APPLICATION

The present application claims the benefit of now abandoned application Ser. No. 60/470,299, filed May 14, 2003, by E. Solie, entitled: "Soft Start Precharge Circuit for DC Power Supply," assigned to the assignee of the present application and the disclosure of which is incorporated herein.

FIELD OF THE INVENTION

The present invention relates in general to electronic circuits and components therefor, and is particularly directed to a soft start precharge circuit that is used to precharge the soft start capacitor to the voltage on the output capacitor of a pulse width modulator-based, switched DC power supply circuit, so as to mitigate against excessive currents, and decrease the time required for the output capacitor to be charged to the reference voltage.

BACKGROUND OF THE INVENTION

Electrical power for an integrated circuit (IC) is typically supplied by one or more direct current (battery) power sources, such as a pulse width modulation (PWM)-based, DC-DC converter. This type of converter contains a PWM signal generator that supplies a synchronous PWM signal to a switching circuit driver. The switching circuit drive, in turn, controls the on-time and off-time of electronic power switching devices (such as a pair of FETs connected between a pair of power supply rails). A common node between the two FETs is coupled through an inductor to a load reservoir or output capacitor, with the connection between the inductor and the capacitor serving as an output node from which a desired (regulated) DC output voltage is applied to the load.

FIG. 1 diagrammatically illustrates a conventional soft start circuit that may be used with such a DC-DC converter. As shown therein, an input reference voltage Vref is coupled to a current limiting (at $I_{Lim}$) Gm Amplifier buffer 10, the output of which is coupled to the non-inverting (+) input 21 of an error amplifier 20 and to a soft start capacitor 30, which is referenced to ground. A feedback resistor 40 is coupled between the output 23 and the inverting (−) input 22 of the error amplifier. The output 23 of the error amplifier is coupled to a pulse width modulator (PWM) 50. The output of the PWM 50 is coupled through an inductor 60 to an output node 65, to which an output capacitor 70, referenced to ground, is coupled. The voltage at the output node 65 is fed back through a feedback resistor 80 to the inverting (−) input 22 of error amplifier 20. A switch 90 is coupled in parallel with the soft start capacitor 30 and operates as follows.

When the DC-DC converter is disabled, the switch 90 is closed, so as to short the capacitor 30 to ground. When the converter is enabled, switch 90 is opened, so that the voltage across the soft start capacitor 30 ramps up from its initial voltage of zero (0) volts to the reference voltage Vref, at a constant charging rate of dv/dt, set by the ratio of $I_{Lim}$/Csoft. The voltage across the output capacitor 70 will follow the voltage ramp across the soft start capacitor 30.

In this circuit, if the output capacitor 70 is charged up at the time the converter is enabled (for example, if the converter is disabled and then reenabled before the output capacitor 70 is discharged), the converter will attempt to discharge the voltage across the output capacitor Cout to the soft start voltage of nearly zero volts across the soft start capacitor 30. If the circuit is not designed properly, the resulting current could be excessively large and may damage components. In addition, circuit operation is inefficient, as it discharges the output capacitor before charging it.

SUMMARY OF THE INVENTION

Pursuant to the invention, rather than couple the soft start switch of the circuit of FIG. 1 to ground, this switch is coupled to the output capacitor. As a result, when the circuit is disabled, the switch shorts the soft start capacitor to the output node. This has the effect of precharging the soft start capacitor to the value of the output voltage. As a consequence, when the DC-DC converter is enabled, it will not attempt to discharge the soft start capacitor, as in the circuit of FIG. 1. Instead, it will ramp the output voltage from its current value to the voltage Vref without excessive currents. In addition, this switch configuration allows the output capacitor to be charged to the reference voltage Vref in a shorter time than the prior art circuit of FIG. 1, since the soft start ramp need not start at zero; it can start at Vout.

In an alternative embodiment the switch is removed and another switch is used in its placed. However, rather than being coupled directly to the soft start capacitor and to the front end of the error amplifier, this auxiliary switch has its common terminal coupled to the buffer amplifier. The switch has a first terminal coupled to the reference voltage and a second terminal coupled to the output node. In this alternative configuration, the soft start capacitor is charged through the buffer amplifier. When the switch is disabled, the positive input of the buffer amplifier is connected to the output node. This causes the soft start capacitor to charge up to the output voltage. When the switch is enabled, the positive input of the buffer amplifier is disconnected from the output voltage and connected instead to the reference voltage.

DETAILED DESCRIPTION

Before describing an embodiment of the soft start precharge circuit of the present invention, it should be observed that the invention resides primarily in arrangements of conventional circuit components, and the manner in which they may be incorporated into a DC converter of the type described above. It is to be understood that the present invention may be embodied in a variety of other implementations, and should not be construed as being limited to only the embodiment shown and described herein. Rather, the implementation example shown and described is intended to supply only those specifics that are pertinent to the present invention, so as not to obscure the disclosure with details that are readily apparent to one skilled in the art having the benefit of present description. Throughout the text and drawings like numbers refer to like parts.

Figure 1:
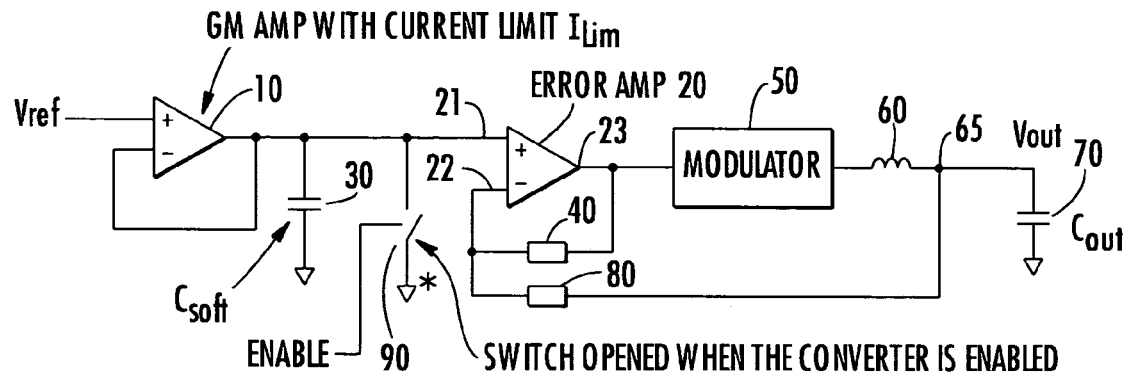
FIG. 1 diagrammatically illustrates a conventional soft start circuit for a DC-DC converter.
Figure 2:
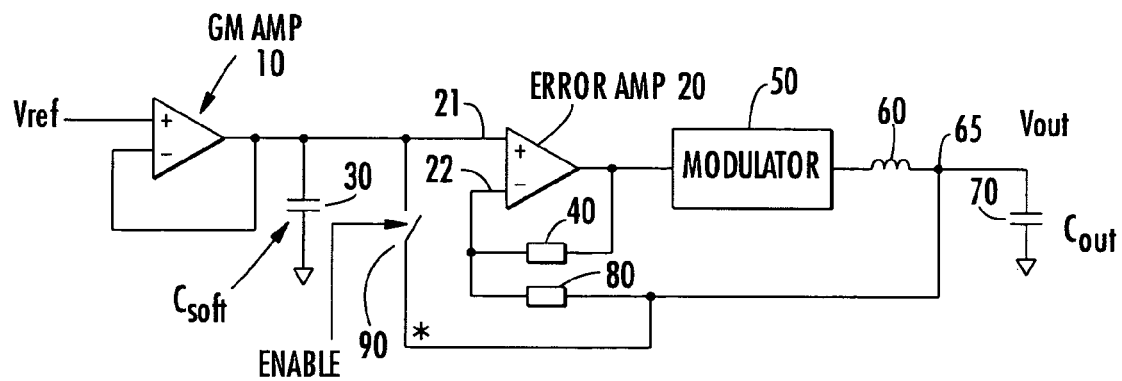
FIG. 2 diagrammatically illustrates an embodiment of a soft start circuit in accordance with the invention.

Attention is now directed to FIG. 2, which diagrammatically illustrates an embodiment of the soft start precharge circuit of the invention. For the most part the circuit of FIG. 2 includes components and interconnections of the same as employed in FIG. 1, and attention may be directed to the description above for an explanation of the same. However, the soft start precharge circuit exhibits a significant difference with respect to the circuit of FIG. 1 with respect to the connections for the switch 90. In particular, rather than reference the switch 90 to ground, as in the prior art circuit of FIG. 1, switch 90 is coupled to the output capacitor 70.

As a result, when the circuit is disabled, the switch 90 shorts the soft start capacitor 30 to the output node 65. This has the effect of precharging the soft start capacitor 30 to the value of the output voltage. This means that when the DC-DC converter is enabled, it will not attempt to discharge the output capacitor 70, as in the circuit of FIG. 1. Instead, it will ramp the output voltage from its current value to the voltage Vref without excessive currents. In addition, it allows the output capacitor 70 to be charged to the reference voltage Vref in a shorter time than the prior art circuit of FIG. 1, since the soft start ramp does not have to start at zero; it can start at Vout.

Figure 3:
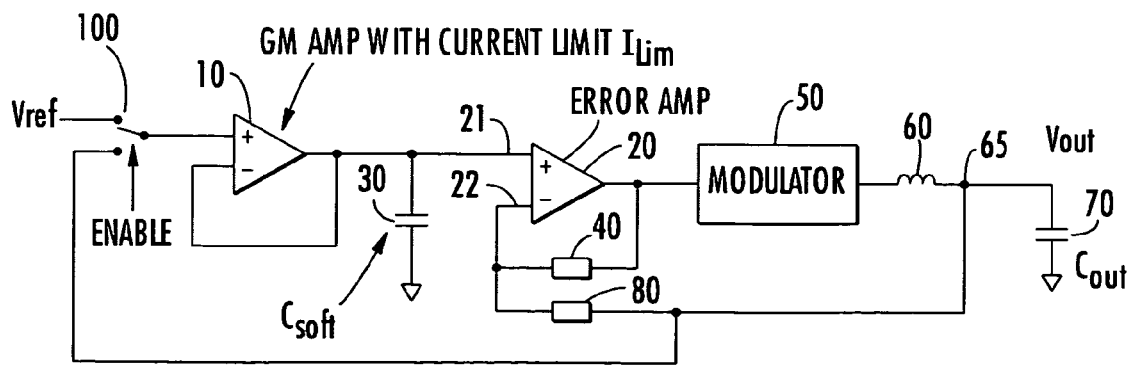
FIG. 3 diagrammatically illustrates an alternative embodiment of a soft start circuit in accordance with the invention.

FIG. 3 illustrates an alternative embodiment to the configuration shown in FIG. 2. In FIG. 2, the switch 90 of FIG. 2 is removed and a switch 100 is used in its placed. However, rather than being coupled directly to the soft start capacitor 30 and to the front end of the error amplifier 20, switch 100 has its common terminal coupled to the non-inverting (+) input of Gm Amplifier buffer 10. Switch 100 has a first terminal coupled to the reference voltage Vref and a second terminal coupled to the output node 65.

In this alternative configuration, the soft start capacitor 30 is charged through the Gm amplifier 10. When switch 100 is disabled, the positive (+) input of the Gm amplifier 10 is connected to Vout at node 65. This causes the Csoft capacitor 30 to charge up to the output voltage. When switch 100 is enabled, the positive (+) input of the Gm amplifier 10 is disconnected from Vout and connected to Vref.

While I have shown and described several embodiments in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed is:

1. In a soft start circuit that is configured for use with a DC-DC converter, wherein an input reference voltage is coupled to an error amplifier and to a soft start capacitor, and wherein a feedback resistor is coupled between an output node and said error amplifier, said error amplifier having its output coupled to a pulse width modulator (PWM), which has its output coupled through an inductor to said output node, to which an output capacitor referenced to ground is coupled, the improvement comprising:
   a switch coupled between said soft start capacitor and said output node, said switch being open when said converter is enabled, and being closed when said converter is disabled, thereby effectively shorting said soft start capacitor to said output node, and precharging said soft start capacitor to the value of the output voltage at said output node.

2. For use with soft start circuit for a DC-DC converter, wherein an input reference voltage is coupled to an error amplifier and to a soft start capacitor, and wherein a feedback resistor is coupled between an output node and said error amplifier, said error amplifier having its output coupled to a pulse width modulator (PWM), which has its output coupled through an inductor to said output node, to which an output capacitor referenced to ground is coupled,
   a method of controlling the operation of said soft start circuit comprising the steps of:
   (a) for an enabled condition of said converter decoupling said soft start capacitor from said output node; and
   (b) for a disabled condition of said converter, coupling said soft start capacitor to said output node, and thereby precharging said soft start capacitor to the value of the output voltage at said output node.

3. A soft start circuit architecture comprising:
   a buffer amplifier to which a reference voltage is coupled, said buffer amplifier having its output coupled to a soft start capacitor and to an error amplifier;
   a pulse width modulator coupled to the output of said error amplifier;
   an inductor coupling the output of said pulse width modulator to an output node to which an output capacitor is coupled;
   a feedback resistor coupled between said output node and said error amplifier; and
   a switch coupled between said soft start capacitor and said output node and being operative, when closed, to effectively short said soft start capacitor to said output node, and thereby precharge said soft start capacitor to the value of the output voltage at said output node.

4. The soft start circuit architecture according to claim 3, wherein said switch is open when said converter is enabled.

5. A soft start circuit architecture comprising:
   a buffer amplifier having a first input coupled to a switch, to which a reference voltage is coupled, said buffer amplifier having its output coupled to a soft start capacitor and to an error amplifier;
   a pulse width modulator coupled to the output of said error amplifier;
   an inductor coupling the output of said pulse width modulator to an output node to which an output capacitor is coupled;
   a feedback resistor coupled between said output node and said error amplifier; and wherein
   said switch is further coupled to said output node and being operative, for a first condition thereof, to connect said first input of said buffer amplifier to said output node and thereby cause said soft start capacitor to charge up to the output voltage at said output node and, for a second condition thereof, to disconnect said first input of said buffer amplifier from said output node and connect said first input of said buffer amplifier instead to said reference voltage.

* * * * *